United States Patent Office 2,888,023
Patented May 26, 1959

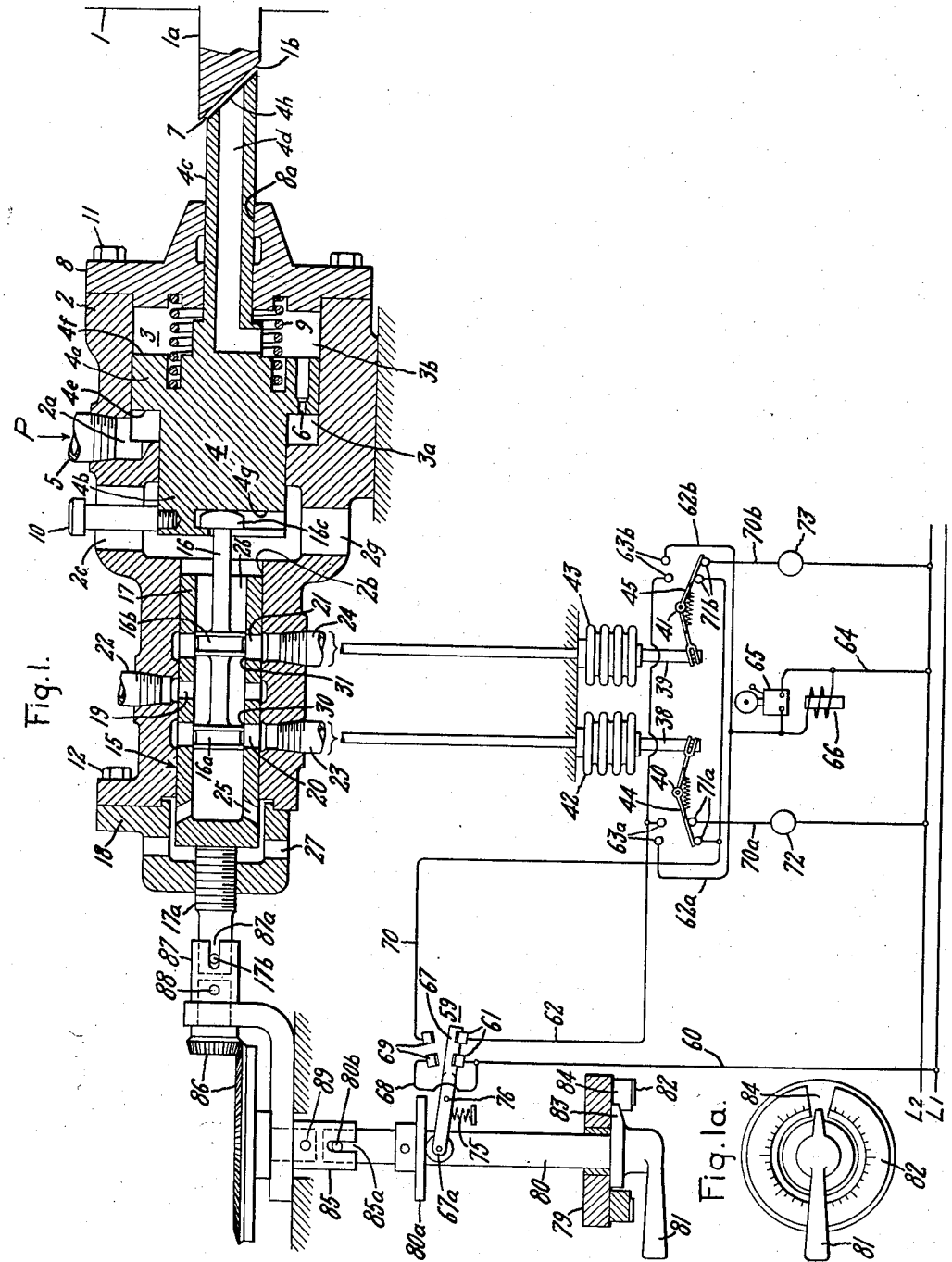

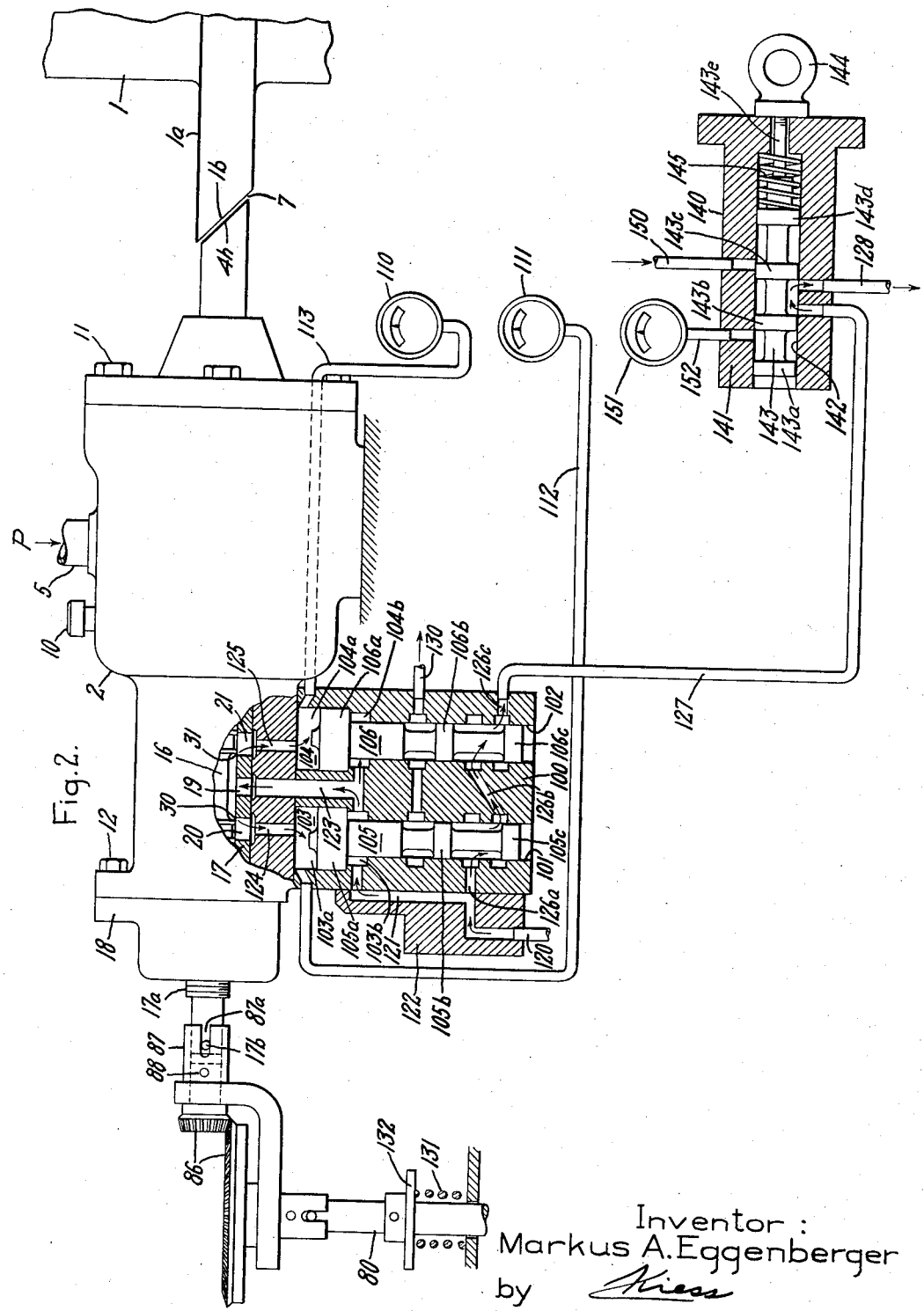

2,888,023

HYDRAULIC THRUST BEARING WEAR INDICATOR AND SAFETY DEVICE

Markus A. Eggenberger, Schenectady, N.Y., assignor to General Electric Company, a corporation of New York Application April 13, 1956, Serial No. 577,994

7 Claims. (Cl. 137—16)

This invention relates to a hydraulically operated safety device for shutting down a rotating machine after a predetermined axial movement of the rotating member, particularly to a safety device for shutting down a turbomachine after a predetermined thrust bearing wear has taken place.

A mechanism commonly used for shutting down a rotating machine such as a turbine after excessive axial movement of the rotor resulting from thrust bearing wear includes a thermal responsive control device. The thermal element of the control device is located in a stationary member such as a shoe attached to a thrust bearing housing. The shoe is located in a groove cut in a sleeve fitted on the turbine shaft and the shoe is contacted by the sleeve after a predetermined bearing wear and corresponding axial movement of the rotor has taken place. The frictional engagement between the sleeve and shoe generates heat to actuate the thermal control device to shut down the turbine.

While this arrangement is relatively simple and has been very reliable, it has a number of shortcomings. One is that there is no way during operation of the turbine to check the amount of thrust bearing wear which has taken place, and another is that it will operate falsely if the ambient temperature is too high. Also, it is very probable that it will be necessary to replace the contacting shoe and sleeve after a thrust bearing failure.

Accordingly, it is an object of this invention to provide a hydraulically actuated safety device for instantly shutting down a rotating machine after a predetermined amount of axial movement of the rotor.

A further object is to provide a safety device which operates without metallic contact with the rotor.

A further object is to provide a mechanism for determining thrust bearing wear during operation of the machine.

A still further object is to provide a safety device which does not require replacement after thrust bearing failure has occurred and the turbine shut down by this device.

Other objects and advantages will be apparent from the following description taken in connection with the accompanying drawings, in which Fig. 1 illustrates a hydraulically operated thrust bearing wear safety device including a pressure responsive electrical tripping device; and Fig. 2 discloses a safety device which is completely hydraulic.

Generally stated, the invention is practiced by providing a rotor position detecting means which follows the axial movement of a turbine rotor incident to thrust bearing wear. The rotor follower means controls the operation of a valve which controls the operation of an automatic safety device which instantly shuts down the turbine upon excessive bearing wear. The safety device and valve are further provided with means for deactivating the automatic operation of the safety device and for measuring the existing bearing wear without requiring the turbine to be shut down.

The form of the invention illustrated in Fig. 1 includes a hydraulically operated rotor position detecting means which controls a valve mechanism. The valve mechanism in turn controls the operation of a pressure operated electrical apparatus for instantly shutting down the turbine.

The function of the hydraulically operated rotor position detecting means is to follow the axial movement of the rotor 1 and control the valve mechanism in accordance with such movement.

The rotor position detecting means may take other equivalent forms but as shown includes a follower piston 4 located in a chamber 3 formed in a housing 2. The piston 4 has a central portion 4a and opposite end portions 4b, 4c. The central portion 4a divides the chamber 3 into separate chambers 3a, 3b. The end portion 4c extends through an opening 8a in a cap 8 which closes the chamber 3 and is fastened thereto by bolts 11. The adjacent surfaces 4h, 1b of end portion 4c and rotor collar 1a respectively are parallel and are disposed at an acute angle relative to the axis of the rotor 1. Defined between the surface 4h, 1b is a narrow gap 7. The piston 4 is prevented from rotating by a bolt 10 which extends through casing opening 2c and is secured to piston 4. It can thus be appreciated that axial movement of the rotor 1 will result in a change in the width of gap 7.

The end portions 4b, 4c are substantially different in area so that the effective areas 4e, 4f of the piston 4 subject to the pressures in chamber 3a, 3b respectively are approximately of the ratio 1:2.

The housing 2 has an inlet opening 2a to which an inlet conduit 5 is connected and through which oil under pressure, for example 25 p.s.i., is supplied to chamber 3a. An orifice 6 is located in the piston body portion 4a to connect the chambers 3a and 3b. The chamber 3b communicates with atmosphere through a nozzle opening 4d in the end portion 4c and gap 7.

As can be appreciated, the flow cross section of the gap 7 when the piston 4 is in a stationary position, is determined by the ratio of the effective areas 4e, 4f of the piston 4b, and the pressure drop through the orifice 6.

The piston 4 remains in a stationary position when the ratio between the pressures in chambers 3a:3b is inversely proportional to the ratio of the effective piston areas 4e:4f. This condition exists and a reference flow cross section area of gap 7 is obtained when gap 7 causes to exist in chamber 3b a pressure equal to the inlet pressure P multiplied by the ratio of areas 4e:4f. The flow cross section area of gap 7 adjusts itself in accordance with orifice 6. Since orifice 6 is built in with a fixed cross section which cannot be changed in operation, gap 7 assumes a corresponding constant steady state width. This width of gap 7, for a given piston area ratio, is determined by the area of orifice 6 and the circumference of nozzle 4d. The width of gap 7 does, in particular, not depend on the initial oil pressure P.

The absolute value of the width of gap 7 is unimportant and cannot easily be measured since inserting a feeler gage into the gap will change the oil pressure area instantly. The steady state width of the gap serves merely as a reference, which if changed is restored by the follower piston to rebalance the piston.

When the flow cross section area of gap 7 is changed by axial movement of the shaft 1, in a direction normal to the axis of piston 4, the pressure in chamber 3b changes, resulting in unbalanced forces acting on piston 4. As a result of this unbalanced condition, the piston 4 moves in a direction to restore the gap 7 to its original area when the piston is again balanced. In the example illustrated, the ratio of the effective piston areas 4e:4f is approximately 1:2, and the flow cross section of the gap 7 and the pressure drop thereacross is substantially equal to that of orifice 6. This relationship occurs since the piston 4 seeks a stable position and when the pressure drop across the orifice 6 is equal to the drop across the gap 7 the pressures acting on the opposite sides of piston 4 are inversely proportional to their effective piston areas, and therefore the forces acting on the opposite sides of the piston are equal, and the piston 4 remains stationary. A small spring 9 is provided between the piston 4 and cover 8 to prevent contact between the nozzle 4c and the shaft collar 1a when oil is not being supplied to the device. This is done in order to avoid metallic contact of the device with the rotor during assembly work on the turbine.

It can be appreciated by one skilled in the art that while specific relationships between the effective piston areas, flow gap area 7, and orifice 6 have been set forth, the invention is not so limited. The only limitation is that piston area 4e must obviously be less than piston area 4f.

The operation of the hydraulically operated rotor position indicating piston can be seen from the following.

Oil under pressure P flows into chamber 3a through conduit 5 and inlet opening 2a. The oil then flows through orifice 6, chamber 3b, nozzle opening 4d and gap 7 to atmosphere. Since the pressure drops across orifice 6 and gap 7 are equal when the piston 4 is in a stable position, the pressure in chamber 3b is one half the difference between P and atmosphere or $$\frac{P}{2}$$

due to the piston area ratio. Thus, it is apparent that when the turbine is started and before any bearing wear takes place, the piston 4 is balanced and assumes a steady position and a finite reference flow cross section area for gap 7. If the rotor 1 moves due to thrust bearing wear, a change in the flow cross section area of the gap 7 occurs which results in a pressure change in chamber 3b to unbalance the forces acting on the piston 4. To compensate for this unbalance, the piston moves a distance proportional to that moved by the rotor to again achieve a balanced condition.

The follower piston 4 is connected to piston valve 16 by a head portion 16c located in a recess 4g in piston 4. Thus there is a definite correlation between the position of the follower piston 4 and the positioning of piston valve 16. The valve 16 is part of a pilot valve assembly 15 that controls the operation of an electrical circuit which operates to shut down the turbine upon thrust bearing failure. The pilot valve assembly 15 controls the flow of fluid under pressure between an inlet conduit 22 and outlet conduits 23, 24 which lead to pressure responsive switches 40, 41 which are part of an electrical circuit described in more detail later.

The pilot valve assembly 15 may take many forms but as shown consists of a piston valve 16 slidably disposed in an adjustable valve sleeve 17 located in the bore 2b in the housing 2. The end of bore 2b is closed by cap 18 secured to the housing 2 by bolts 12. The sleeve 17 has an end portion 17a which is threaded into and extends through cap 18 and which is moved by rotating end portion 17a to adjust the setting of the pilot valve. The valve sleeve 17 and casing 2 define aligned axially disposed ports 19, 20 and 21 which are connected to inlet conduit 22 and outlet conduits 23, 24 respectively. The sleeve 17 also has drain openings 25, 26 which connect up with openings 27 and 28 in cap 18 and housing 2 respectively to return fluid in the drain openings to a sump (not shown). Piston valve 16 has axially disposed lands 16a, 16b which control the flow between inlet conduit 22 and outlet conduits 23 and 24 respectively. The piston valve is constructed so that in the neutral position, as shown in the drawings, the widths of the openings 30, 31 between the lands 16a, 16b and ports 20, 21 respectively are substantially equal to the amount of thrust bearing wear and resulting axial movement of the rotor permitted before actuation of the electrical circuit for shutting down the turbine. The lands 16a, 16b are the same width as the ports 20, 21 so that conduits 23, 24 are not opened to drain openings 25, 26 until the axial movement of the rotor has exceeded the width of either opening 30 or 31 respectively. The initial setting of the pilot valve assembly 15 in the neutral position, as shown, is accomplished by adjusting the sleeve 17 by a mechanism to be discussed in detail later.

The conduits 23, 24 are in communication with pressure responsive resilient bellows 42, 43 which are designed to be normally in compression. Extending from bellows 42, 43 are rods 38, 39 respectively, connected to switches 40, 41 which are part of the electrical safety circuit which is energized to shut down the turbine on thrust bearing failure.

The switch 40 consists of a pivotally mounted switch member 44 which pivots between contacts 63a and 71a. Switch 41 is similar to switch 40 and includes a pivotally mounted switch member 45 which pivots between contacts 63b and 71b. The contacts 63a, 63b are located in a safety circuit which operates to energize a solenoid 66 and inactivate the turbine. The solenoid 66 is a conventional representation of a device which when energized shuts down the turbine. The contacts 71a, 71b are located in a second circuit which permits the bearing wear to be tested during turbine operation. The function of the test circuit is to deenergize the safety circuit and to indicate the position of the pilot valve to permit the measurement of the existing bearing wear in a manner to be described in detail later. A switch 59 consisting of switch member 67 and contacts 61 and 69 is provided to deenergize the safety circuit and close the test circuit while the turbine is operating.

The electrical safety circuit is located between voltage supply lines $L_1$, $L_2$ and consists of lead 60, contacts 61, normally closed by the manually operated switch member 67, lead 62, parallel branch leads 62a, 62b in which are located contacts 63a, 63b respectively, which are open when bellows 42, 43 respectively are under full pressure, and lead 64 which connects branch leads 62a, 62b to supply line $L_2$ and contains alarm 65 and solenoid 66.

The test circuit consists of lead 60, branch lead 68, normally open contacts 69, lead 70, parallel branch leads 70a, 70b in which are located contacts 71a, 71b that are closed when the pressure in bellows 42, 43 respectively is lost, and test lamps 72, 73 respectively. The circuitry illustrated is but one way of connecting the various components disclosed and it is apparent that many other equivalent arrangements could be used.

The structure for deenergizing the safety circuit and adjusting the pilot valve independently of the follower piston 4 to measure the thrust bearing wear includes a rod 80 having a collar member 80a secured to it at an intermediate point. The collar 80a is contacted by an end portion 67a of the switch member 67 which when moved downward opens contacts 61 to deenergize the safety circuit. Switch member 67 is biased into contact with contacts 61 and collar 80a by spring 75 disposed adjacent to pivot 76. On the lower end of rod 80 is a handle 81 having a pointer 83 located in a gap 84 (Fig. 1a) formed between the ends of an indicating dial 82 secured to plate 79. The upper end of rod 80 is connected to the valve sleeve extension 17a through sleeve 85, bevel gears 86 and sleeve 87. The rod 80 is permitted to move vertically relative to sleeve 85 by an associated pin and slot connection 80b, 85a. The depth of slot 85a is greater than that of gap 84 so that rod 80 and sleeve 85 remain in contact when handle 81 is moved out of gap 84 to adjust valve sleeve 17. Horizontal movement of valve sleeve 17 is similarly permitted by pin 17b and slot 87a. Sleeves 85, 87 are secured to gears 86 by pins 89, 88 respectively.

The operation of this device can be seen from the following.

When the rotor 1 moves axially in the upward direction (Fig. 1) a distance equal to or greater than the permissible thrust bearing wear, the axial width of gap 7 is increased by the same amount. This increase in gap 7 reduces the pressure in chamber 3b to unbalance the piston 4. The pressure in chamber 3a then moves the piston to the right a distance proportional to the upward movement of rotor 1 to restore the flow cross section of gap 7 to its original dimensions where the piston 4 is again balanced. Piston 4 moves pilot valve 16 to the right to cut off outlet port 20 from inlet port 19 and opens port 20 and associated conduit 23 to drain ports 25, 27. This reduction of pressure in conduit 23 permits resilient bellows 42 to move upward to move switch member 44 to close contacts 63a to close the safety circuit to energize the solenoid 66 to shut down the turbine.

If rotor 1 moves axially downward, the axial width of gap 7 is decreased by the same amount to increase the pressure in chamber 3b to unbalance the piston 4. The increased pressure in chamber 3b then moves the piston to the left a distance proportional to the downward movement of rotor 1 to restore the flow cross section of gap 7 to its original dimensions where the piston is again balanced. Piston 4 moves pilot valve 16 to the left to cut off outlet port 21 from inlet port 19 and opens port 21 and associated conduit 24 to drain ports 26, 2g. The reduced pressure in conduit 24 permits resilient bellows 43 to move upward to move switch member 45 to close contacts 63b to close the safety circuit to energize the solenoid 66 to shut down the turbine.

When it is desired to measure the bearing wear while the turbine is running, the handle 81 and associated rod 80 and collar 80a is moved downwardly and engages switch member 67a to rotate it about pivot 76 to close contacts 69 and open contacts 61. This deenergizes the safety circuit to prevent the turbine from being automatically shut down when the pilot valve sleeve 17 is moved to a position to vent the fluid under pressure in conduits 23 or 24. When the contacts 69 are closed, the test lights 72, 73 are on since the circuit containing them is completed through contacts 71a, 71b. As previously mentioned, the switch members 44, 45 are moved by bellows 42, 43 and associated rods 38, 39 to close contacts 71a, 71b when high pressure fluid is supplied to conduits 23, 24 from inlet conduit 22. This condition exists during normal operation of the turbine and before excessive thrust bearing wear has taken place. By rotation of the handle 81 the valve sleeve 17 is then moved, for example, to the left to close outlet port 20 off from inlet port 19 and open outlet port 20 and conduit 23 to atmosphere. When this occurs, the bellows 42 moves upward carrying the rod 38 which pivots switch member 44 to open contacts 71a to open the test circuit which turns off light 72. Therefore, since the amount of permissible thrust bearing wear is known from the initial setting of the pilot valve, and the movement of handle 81 required to shut off the lights is indicated on calibrated indicator 82, the amount of bearing wear is readily determined by subtracting the reading of indicator 82 from the known valve setting. The difference between them indicates the exact amount of bearing wear existing at the time the test is being made. This can be repeated for determining the bearing wear in the other direction under operating conditions where the net thrust on the rotor has reversed its direction.

While in Fig. 1 an electrical circuit is shown for shutting down the turbine, it is obvious that other types of apparatus might be employed. One such alternate arrangement is disclosed in Fig. 2. The apparatus disclosed in Fig. 2 other than the rotor follower means and pilot valve assembly which is the same as Fig. 1, comprises a valve assembly which regulates the flow of fluid under pressure to a conventional mechanism for shutting down the turbine. The operation of this valve assembly is controlled by the setting of the pilot valve assembly 15 in the same manner as the electrically operated shutdown mechanism of Fig. 1 is controlled.

This valve assembly consists of a housing 100 having parallel bores 101, 102 which terminate in chambers 103, 104 respectively. The bottom of the bores 101, 102 are open to a sump (not shown). Located in each of the bores and having head portions 105a, 106a disposed in the chambers 103, 104 are piston valve members 105, 106 respectively. Valve head portions 105a, 106a divide the chambers 103, 104 into chambers 103a, 103b and 104a, 104b respectively. The piston valves 105, 106 further define axially spaced land portions 105b, 105c and 106b, 106c respectively.

Oil under pressure flows into pilot valve inlet port 19 through inlet pipe 120, conduit 121 located in housing 122 connected to housing 100, and conduit 123 which also communicates with chambers 103b and 104b. Pilot valve outlet ports 20, 21 are in communication with chambers 103a, 104a through conduits 124, 125 respectively.

A second conduit 126 in the valve housing 100 having portions 126a, 126b and 126c connects inlet conduit 121 with conduit 127, which leads to a valve 140 to be described in detail later. The conduit portions 126a, 126b, 126c extend between conduit 121 and bore 101; bore 101 and bore 102; and bore 102 and conduit 127 respectively.

The piston valves 105, 106 are shown in the neutral position before any thrust bearing wear has taken place and the pilot valve assembly 15 maintains contact between the inlet port 19 and outlet ports 20, 21. In this position, the conduit 126 intersects the bores 101, 102 between the axially spaced lands 105b, 105c and 106b, 106c respectively. In the event of leakage past land portions 105b, 106b there is provided a drain conduit 130. Trip indicating gauges 110, 111 are connected to chambers 103a, 104a through conduits 112, 113 respectively. The fluid under pressure in conduit 126 passes through conduit 127, bore 142 in valve 140, and conduit 128 to communicate with a conventional fluid pressure operated mechanism for shutting down the turbine. In the example shown, the shutdown mechanism operates on a drop in pressure in conduit 128.

The function of the valve 140 is to deactivate the automatic operation of the hydraulic safety mechanism to permit measurement of the thrust bearing wear without shutting down the turbine. It performs the equivalent function of the manually operated switch 67 in the electrical safety circuit. The valve 140 comprises a housing 141 defining a bore 142 in which is located a piston valve member 143 having axially spaced lands 143a, 143b, 143c, 143d and a stem 143e on which is fastened a head portion 144. The head 144 abuts the housing 141 to limit the movement of valve 143 to the left effected by spring 145 located between land 143d and housing 141. Leading into housing 141 is conduit 150 which supplies oil under pressure to conduit 128 to prevent the turbine from automatically shutting down when the pilot valve is moved to the testing position. A test gauge 151 is connected to valve 141 through conduit 152 for measuring the pressure in branch conduit 127 in order to establish the exact turbine shutdown point when the bearing wear is being measured.

The operation of this modified shutdown mechanism can be seen from the following.

When valve 16 moves to the right as a result of thrust bearing wear (this operation is exactly the same as described with respect to Fig. 1) gap 30 is closed and outlet port 20 and associated conduit 124 is opened to atmosphere. The pressure in chamber 103a is reduced accordingly and the pressure in chamber 103b moves piston valve 105 in the upward direction. This upward movement opens conduit 126b with the bottom of bore 101 to empty the fluid in conduits 126b, 126c, 127 and 128 to a sump (not shown). The pressure in conduits 127 and 128 is dropped to atmosphere which results in the actuation of the tripping mechanism to shut down the turbine.

When it is desired to measure the bearing wear, the handle 144 is pulled out to interconnect conduit 150, containing oil under pressure, to conduit 128 to prevent the turbine from shutting down during adjustment of the pilot valve sleeve 17, and to connect conduits 152, 127 to indicate the pressure in line 126c. The valve sleeve 17 is moved by rod 80 and gear 86 in substantially the same way as disclosed with respect to Fig. 1 except that the vertical movement is not used to operate a switch but only to disengage the pointer of handle 81 from the notch 84 which holds the device in the neutral position during normal operation. A spring 131 biasing the rod 80 upwardly on collar 132 is used for this purpose instead of spring 75 in Fig. 1. The valve sleeve is moved to the left until gauge 151 gives a zero reading, which indicates that the maximum permissible bearing wear has taken place. The dial 82 (Fig. 1) is then read and bearing wear is determined by subtracting the reading from the amount of permissible bearing wear, which is known, from the initial setting of the pilot valve 15.

It will be seen that the invention provides an improved hydraulic-electrical device for shutting down a turbine after a predetermined amount of thrust bearing wear has taken place, which operates without metallic contact with the turbine rotor and which can be used to measure the thrust bearing wear existing at any time during normal turbine operation.

While only two embodiments of the invention have been disclosed completely herein, it will of course be appreciated that numerous modifications and substitutions of equivalents may be made; and it is of course intended to cover by the appended claims all such modifications as fall within the true spirit and scope of the invention.

What I claim as new and desire to secure by Letters Patent of the United States is:

1. A safety device for shutting down a rotating machine upon a predetermined axial movement of a rotor subject to excessive axial movement indicative of an abnormal operating condition when thrust bearing failure occurs, the combination of separately mounted hydraulically positioned means following the axial movement of the rotor, valve means connected to and positioned by said rotor following means whereby the setting of the valve is determined by the axial position of the rotor, means including pressure responsive means for shutting down the machine, and conduit means between the valve means and said pressure responsive means, whereby the pressure responsive means is controlled by the valve means in accordance with the axial movement of said rotor.

2. A safety device for shutting down a rotating machine when thrust bearing failure occurs including a rotor that moves axially an excessive amount incident to thrust bearing failure, the combination comprising separately mounted hydraulically positioned means for following the axial movement of the rotor, valve means connected to and positioned by said follower means whereby the setting of the valve is determined by the axial position of the rotor, electrical means for shutting down the rotating machine, said shutdown means including pressure responsive switching means, and conduit means between said valve means and switching means, whereby the electrical shut-off means is controlled by the valve means in accordance with the axial movement of the rotor.

3. A safety device for shutting down a rotating machine when thrust bearing failure occurs including a rotor subject to excessive axial movement upon thrust bearing failure, the combination including a rotor follower means disposed adjacent to the rotor and following the axial movement thereof, a first valve means connected to and positioned by said follower means whereby the setting of the first valve means is determined by the axial position of the rotor, means for shutting down the rotating machine after a predetermined axial rotor movement, said shutdown means including a second valve means, conduit means connecting said first and second valve means whereby said second valve means is controlled in accordance with the position of the first valve means as determined by the axial movement of the rotor.

4. A device for measuring thrust bearing wear and for shutting down a rotating machine upon thrust bearing failure including a rotor supported by thrust bearings and subject to excessive axial movement incident to thrust bearing failure, the combination of follower means disposed adjacent the rotor for following the axial movement thereof, valve means connected to and positioned by said follower means whereby the valve means is regulated by the axial movement of the rotor, means including pressure responsive means for shutting down the rotating machine, conduit means between said valve means and pressure responsive means whereby the shut-off means is regulated by said valve means, means for determining thrust bearing wear including means for regulating said valve means independently of the follower means, means for deactivating said shut-off means whereby the machine will not automatically shut off when the bearing wear is being determined, and means for indicating thrust bearing wear.

5. A mechanism for measuring axial movement of a rotor and for shutting down a rotating machine after thrust bearing failure including a rotor subject to a predetermined amount of axial movement incident to thrust bearing failure, the combination of means disposed adjacent to the rotor for following its axial movement, pilot valve means connected to and positioned by the rotor following means whereby the valve means is regulated by the axial movement of the rotor, electrical means for shutting off the rotating machine including pressure responsive switching means, conduit means connecting the valve means and said pressure responsive means whereby the shut-off means is controlled by the valve means, and means for determining the axial movement of the rotor during normal operation including means for regulating the valve means independently of the follower means, second switching means for deenergizing the shut-off means to prevent shutdown of the machine when the axial position of the rotor is being measured, means for operating said second switching means, and means for indicating the axial movement of said rotor.

6. Mechanism for measuring thrust bearing wear and for shutting down a rotating machine upon thrust bearing failure including a rotor supported by thrust bearings and subject to a predetermined axial movement incident to thrust bearing failure, the combination comprising means following the axial movement of said rotor, a first valve means connected to and positioned by said follower means whereby the first valve means is adjusted in accordance with the axial movement of the rotor, means for automatically shutting off the rotating machine after a predetermined axial movement of the rotor including a second valve means having a pressure responsive mechanism for operating said second valve, conduit means connecting the first valve means and said pressure responsive mechanism whereby said second valve means is controlled in accordance with the movement of the first valve means, detecting means for measuring the axial movement of the rotor during operation of the machine including means for regulating the first valve means independently of the follower means, means for deactivating the automatic shut-off means, whereby the first valve means can be moved to a position where the rotating machine would normally automatically shut down without shutting down the machine, and means connected to said detecting means for indicating the amount of such movement whereby the amount of bearing wear can be determnied.

7. A device for determining thrust bearing wear and for shutting down a rotating machine upon thrust bearing failure including a rotor subject to excessive axial movement incident to thrust bearing failure and comprising a rotor position detecting means following the axial movement of the rotor, hydraulic pilot means including a housing with a reciprocable spindle member connected to be positioned by axial movement of said rotor follower means, said spindle member having at least two axially spaced land portions, an axially slidable bushing member surrounding said spindle member and having axially spaced ports adapted to be at least partly covered by said spindle land portions when the spindle is in the neutral position, first conduit means supplying operating fluid under pressure to a central chamber defined within the bushing member and between the spindle land portions, means including pressure responsive means for shutting down the rotating machine, second conduit means connecting said bushing ports and pressure responsive means, whereby the shut-off means is actuated when the spindle member of the hydraulic pilot means reaches a first position as determined by the axial movement of the rotor, means for deactivating said shut-off means, and means for manually repositioning said bushing axially to locate the spindle in said first position, and means for indicating the amount of displacement of said bushing member required to relocate the bushing in said first position, whereby the axial displacement of the rotor from its original position can be determined without shutting down the machine.

References Cited in the file of this patent
UNITED STATES PATENTS
2,435,343     Downey _____ Feb. 3, 1948

FOREIGN PATENTS
701,530     Great Britain _____ Dec. 30, 1953